Jan. 13, 1959  H. E. DREW ET AL  2,867,849
METHOD OF MAKING SLIP-FINISH FLOCK COATED RUBBER ARTICLE
Filed Dec. 15, 1954

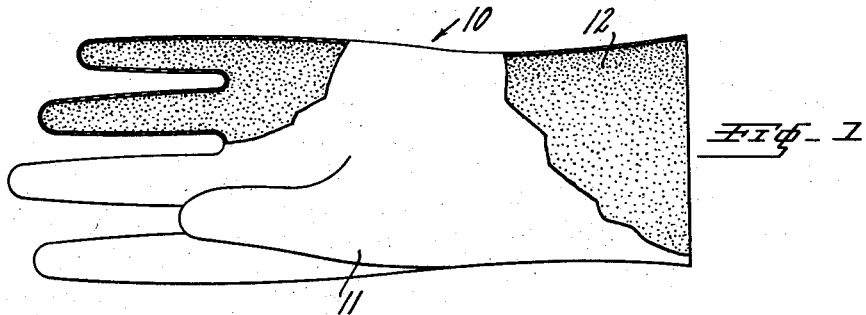

APPLY RUBBER LATEX COATING TO FORM
↓
DIP FORM IN COAGULANT
↓
REMOVE AND DRY COAGULANT TO A DAMP CONDITION
↓
DIP IN MIXTURE OF WATER SOUBLE GELLING AND THICKENING AGENT, LATEX, AND FLOCK
WITHDRAW FORM SLOWLY AND HANG
↓
LEACH IN WARM WATER TO REMOVE SOLUBLE AGENTS IN COATING OF LATEX AND FLOCK
↓
DIP IN STRIPPING SOLUTION
↓
REMOVE FORM AND DRY COATING OF STRIPPING SOLUTION
↓
VULCANIZE ARTICLE ON FORM
↓
WET THE DRIED COATING OF STRIPPING SOLUTION ON ARTICLE AND STRIP FROM FORM
↓
TUMBLE IN HOT WATER
↓
TUMBLE IN AN AQUEOUS BATH CONTAINING A HALOGENATING AGENT
↓
NEUTRALIZE BATH AND DRAIN
↓
TUMBLE ARTICLE IN HEATED DRY AIR

INVENTORS
HOWARD E. DREW
ALBERT L. WARDEN
EDOUARD A. BRODEUR
BY
ATTORNEY

United States Patent Office 2,867,849
Patented Jan. 13, 1959

2,867,849

METHOD OF MAKING SLIP-FINISH FLOCK COATED RUBBER ARTICLE

Howard E. Drew, Greenville, R. I., Albert L. Warden, Fall River, Mass., and Edouard A. Brodeur, Jr., Greenville, R. I., assignors to United States Rubber Company, New York, N. Y., a corporation of New Jersey Application December 15, 1954, Serial No. 475,469

5 Claims. (Cl. 18—58.6)

This invention relates to the manufacture of rubber articles having a slip-finish flock and rubber coating thereon, and particularly to the manufacture of hollow rubber articles, such as gloves, deposited from rubber latex and having a lining formed of a coating of flock and rubber which is provided with a slip-finish.

It is desirable to provide a slip-finish on the surface of certain rubber articles, such as gloves, for the purpose of decreasing the coefficient of friction of the surface of the article. The slip-finish is particularly useful as a lining for rubber gloves in order that they may be slipped on and off the hands with less effort. Such linings are also useful in other hollow articles, such as waterproof footwear.

Heretofore coatings of flock have been applied to the surfaces of rubber articles to reduce the coefficient of friction of such surfaces. The flock, which is minute particles of fiber, such as, cotton, flax, wool, nylon and rayon, or the like, has been applied by blowing or dusting it onto the tacky surface of the rubber. Flock coatings applied in that manner are relatively thin, and they are easily worn off the rubber surface. In order to improve the quality of the flock coating, the flock has been deposited on the tacky rubber surface in an electrostatic field to orient the flock fibers so that their ends impinge on the tacky rubber surface and thereby form a thicker coating and a better bond between the fibers and the rubber. Such method is costly because of the more expensive equipment, and more skill required to operate the process.

Flock coatings have also been employed by mixing the flock with rubber latex, and depositing the mixture as a coating on the rubber base in order to secure a better bond. In the practice of that process, the rubber deposited on the exposed flock fibers produced a non-slip finish, that is a surface having a high coefficient of friction with the human skin or other surfaces.

In accordance with this invention a thick strongly bonded flock coating having a slip-finish, that is, a finish having a relatively low coefficient of friction, is produced by suitably compounding rubber latex and mixing it with the flock in certain proportions in order to obtain a large exposure of flock fibers after the mixture is applied to to a predeposited rubber base. The flock coating is subsequently treated to reduce the tackiness of the rubber on the flock fibers and to expose the fibers by raising the ends thereof from the rubber bonding surface. This improved process utilizes only conventional rubber mixing and handling equipment.

This invention and its objects are more clearly described in reference to accompanying drawings, in which Fig. 1 is a view of a rubber glove made in accordance with this invention and having parts broken away to expose the slip-finish lining therein, and on which an outline of the process of its manufacture is inserted below the glove.

The practice of this invention is described in reference to the manufacture of the glove 10, illustrated in Fig. 1, as it appears when worn on the hand, and whenever the word "rubber" is used, it includes natural and synthetic rubber. The glove 10 is provided with an outer layer of rubber 11, and an inner layer or lining 12 of rubber and flock fibers which is provided with a slip-finish. The outer layer 11 and the lining 12 are deposited in the reverse on a glove form, preferably a conventional baked porcelain form, so that the outer layer 11 will be next to the form and will receive the imprint thereof. The lining 12 is applied over the outer layer 11, and when the glove is stripped from the glove form, the last applied layer 12 will be on the inside and form the lining for the outer protective all rubber layer 11 of the glove, as shown in Fig. 1.

In the manufacture of the glove 10, the outer layer of rubber 11 is applied to the glove form in any conventional manner, as by immersing the form in rubber latex so as to apply a film of rubber thereon. After this film has been allowed to stand and solidify, it is immersed in a coagulant dip, for example 15% of acetic acid and 85% commercial ethyl alcohol. The glove form is then removed from the dip and allowed to dry to a damp condition.

The coagulant treated film of rubber 11 is then immersed in a bath containing a mixture of latex and flock, in the proportions of about 33 parts of flock to about 95 to 100 parts of latex and compounding ingredients including water-soluble gelling and thickening agents. An example of such latex and flock containing mixture is given under the heading below:

*Latex and flock compound*

| Ingredients | Parts Dry Wgt. | Parts Wet Wgt. |
|---|---|---|
| Water | | 550.75 |
| 1.5% Superloid Sol. #1—A high viscosity water soluble latex gelling and thickening agent, an ammonium derivative of algin | 1.20 | 80.00 |
| Modicol VD Sol. #3—A wetting, stabilizing and dispersing agent for latex compounds (which also acts as a gelling and thickening agent) | 5.25 | 105.00 |
| Lissapol N-380—A wetting agent for organic fibers. A condensation product of ethylene oxide with alkyl phenol in syrupy liquid form | 3.75 | 3.75 |
| #60 Cotton flock | 49.60 | 49.60 |
| Titanium dioxide | 13.15 | 21.90 |
| 2-Ethyl hexanol | 0.20 | 0.20 |
| Pigment in paste form | 2.08 | 8.00 |
| Natural rubber latex | 146.50 | 257.00 |
| Total | 221.73 | 1,076.20 |

The above ingredients should be mixed in a high speed stirring apparatus in the order given above. The flock should be added slowly and wet thoroughly before adding the rubber latex.

The glove form is then slowly withdrawn from the bath of latex and flock, for example at the rate of one foot in every 90 seconds. The coating of latex and flock is allowed to solidify sufficiently to be washed in warm water without injury, which washing step is carried out as the next step in the process to remove water-soluble compounds in the coating. It has been found in the particular mixture of latex and flock set forth above that this last coating should be allowed to stand for 5 minutes and then washed in warm water at a temperature of 120° F. for 10 minutes to remove the water-soluble ingredients, particularly, the thickening and gelling agents.

The glove form with the rubber coatings thereon is then removed from the washing water and dipped in a lubricating stripping solution which is not injurious to the rubber and flock coating, and which will deposit a lubricating film thereon. A suitable lubricating bath may consist of an aqueous solution containing a water-soluble polymeric hydrophilic colloid. Examples of such water-soluble polymeric hydrophilic colloids are alkali polyacrylates, e. g., sodium polyacrylate; cellulose ethers e. g., methyl cellulose; proteins e. g., gelatin and casein; vegetable mucilages, e. g., sodium ammonium alignates, and similar materials commonly used as water thickening agents. These materials may be used in varying concentrations, but sufficient to form a coating when dried on the latex and flock coating. A typical lubricating solution may consist of an aqueous solution containing 4% methyl cellulose and 96% water.

After the glove form is removed from the lubricating bath, the coating thereon is dried. Where the above cited methyl cellulose lubricating solution is used, the coating is preferably dried for 60 minutes at 140 to 160° F.

The rubber coatings 11 and 12 are then vulcanized, and where the particular mixture of latex and flock in the formulation above is used, the coating is vulcanized for 45 minutes at a temperature of 270° F. in the conventional hot air oven.

After the removal of the glove form with the glove thereon from the oven, the gloves are stripped from the form. This operation is performed by thoroughly wetting the lubricating coating and pulling the cuff of the glove over the hand portion so as to turn the glove and place the coating of latex and flock on the inside, and form the lining 12 thereof. The stripping operation is preferably carried out by pouring or spraying warm water at a temperature of about 100° F. over the upwardly projecting fingers of the glove, and simultaneously pulling the cuff of the glove upwardly over the hand portion thereof so as to strip the glove from the form.

The glove is then washed to remove the lubricating coating therefrom. Preferably the glove is washed with a batch of gloves in a tumbler, and in the event the lubricating bath containing the methyl cellulose has been used, the batch of gloves are tumbled for 45 minutes in hot water at 160° F., which raises the flock nap.

The gloves are now treated to produce the slip-finish thereon. This is done by halogenating the glove including the latex flock lining 12, and drying and tumbling the gloves as a batch in a tumbler.

Preferably the halogenating treatment is carried out by placing a batch of gloves in a tumbler containing water and a halogen gas, such as chlorine or bromine. For example the bath may contain 0.1% chlorine or bromine gas dissolved in the water. The gloves are tumbled in such a bath for about 15 minutes.

The chlorine bath is then neutralized and the water drained out of the tumbler. The batch of gloves are then tumbled in the presence of heated dry air until they are dry and the nap, or ends of the flock fiber has been raised. For example, the gloves may be tumbled in dry air at 150° F. for one hour.

The halogenation of the rubber gloves, particularly the rubber flock lining and the tumbling of the gloves produces the slip-finish thereon by virtue of reducing the surface coefficient of friction of any rubber that may remain on the exposed fibers of the flock. The quality of the slip-finish is also improved by the relatively small portion of flock to the rubber content in the latex flock coating, which proportion is reduced by the gelling and thickening agents used therein.

While the present preferred method of practicing the invention has been described herein, it will be understood that changes in the details thereof may be made without departing from the spirit of the invention or the scope of the appended claims.

Having thus described our invention, what we claim and desire to protect by Letters Patent is:

1. The method of manufacturing a flock coated hollow rubber article comprising the steps of applying a rubber latex coating to a form, applying coagulant to said rubber latex coating, applying a second coating containing a mixture of a water soluble gelling and thickening agent, flock and rubber latex, said flock being mixed with the water soluble gelling and thickening agent before the latex is added, washing said second coating to remove said gelling and thickening agent, vulcanizing said rubber containing coatings, removing said article from said form, tumbling said article in a water bath, tumbling said article in an aqueous bath containing a halogenating agent, separating said bath and said article, and drying said article.

2. The method of manufacturing a flock coated hollow rubber article comprising the steps of applying a rubber latex coating to a form, applying coagulant to said rubber latex coating, applying a second coating containing a mixture of a water soluble gelling and thickening agent, flock and rubber latex in the proportions of about 33 parts of flock and 95 to 100 parts of rubber solids, said flock being mixed with the water soluble gelling and thickening agent before the latex is added, washing said second coating to remove said gelling and thickening agent, vulcanizing said rubber containing coatings, removing said article from said form, tumbling said article in a water bath, tumbling said article in an aqueous bath containing a halogenating agent, neutralizing said halogenating agent in said bath, draining said neutralized bath from said article and tumbling said article in heated dry air until said article has been thoroughly dried and the flock nap has been raised thereon.

3. The method of manufacturing a flock coated hollow rubber article comprising the steps of applying a rubber latex coating to a form, applying coagulant to said rubber latex coating, applying a second coating containing a mixture of a water soluble gelling and thickening agent, flock and rubber latex, said flock being mixed with the water soluble gelling and thickening agent before the latex is added, washing said second coating to remove said gelling and thickening agent, applying a lubricating coating of an aqueous solution containing a highly water-soluble polymeric hydrophilic colloid to said latex-flock coating, drying and vulcanizing said rubber containing coatings, wetting said lubricating coating, removing said article from said form, tumbling said article in a water bath, tumbling said article in an aqueous bath containing a halogenating agent, separating said bath and said article, and drying said article.

4. The method of manufacturing a hollow rubber article provided with a slip-finish flock and rubber lining, comprising the steps of applying a rubber latex coating to a form, applying coagulant to said rubber latex coating, applying a second coating containing a mixture of a water soluble gelling and thickening agent, flock and rubber latex in the proportions of about 33 parts of flock and 95 to 100 parts of rubber solids, said flock being mixed with the water-soluble gelling and thickening agent before the latex is added, washing said second coating in warm water to remove said gelling and thickening agent, applying a lubricating coating of an aqueous solution containing a highly water-soluble polymeric hydrophilic colloid to said latex-flock coating, drying and vulcanizing said rubber containing coatings, wetting said lubricating coating, removing said article from said form, tumbling said article in a water bath, tumbling said article in an aqueous bath containing a halogenating agent, separating said bath and said article, and drying said article.

5. The method of making a rubber glove provided with a slip-finish lining of rubber and flock fibers comprising the steps of applying a rubber latex coating to a glove form, immersing said coating in a coagulant bath, removing said form from said coagulant bath and drying the coagulant thereon to a damp condition, immersing said form in a mixture of a water-soluble gelling and thickening agent, flock and rubber latex in the proportions of about 33 parts of flock and 95 to 100 parts of rubber solids to form a flock-latex coating, said flock being mixed with the water soluble gelling and thickening agent before the latex is added, withdrawing said form from said mixture, suspending said form in the air until said flock and latex coating thereon has solidified, washing said coating of flock and latex to remove said gelling and thickening agent therein, immersing said flock-latex coating in a lubricating bath of an aqueous solution containing water-soluble polymeric hydrophilic colloid, drying said coatings and vulcanizing the rubber portion of said coatings, wetting the dried lubricating coating and stripping said rubber glove from said form, tumbling the said gloves in hot water to remove the lubricating coating, and to raise the flock nap, tumbling said gloves in an aqueous bath containing about 0.1% of halogenating agent, neutralizing said bath, draining said bath from said glove, and tumbling in the presence of dry air at about 150° F. to dry said glove and raise the flock fiber nap.

References Cited in the file of this patent

UNITED STATES PATENTS

| | | |
|---|---|---|
| 1,740,994 | McGavock | Dec. 24, 1929 |
| 1,960,437 | Foley | May 29, 1934 |
| 2,064,143 | Belton | Dec. 15, 1936 |
| 2,102,456 | Brill et al. | Dec. 14, 1937 |
| 2,120,722 | Tillotson | June 14, 1938 |
| 2,141,788 | Hurt | Dec. 27, 1938 |
| 2,173,734 | Sidnell | Sept. 19, 1939 |
| 2,273,995 | Rogerson | Feb. 24, 1942 |
| 2,434,035 | De Laney et al. | Jan. 6, 1948 |